INVENTOR.
WILLIAM F. BERCK
BY
Oscar A. Mellin
ATTY.

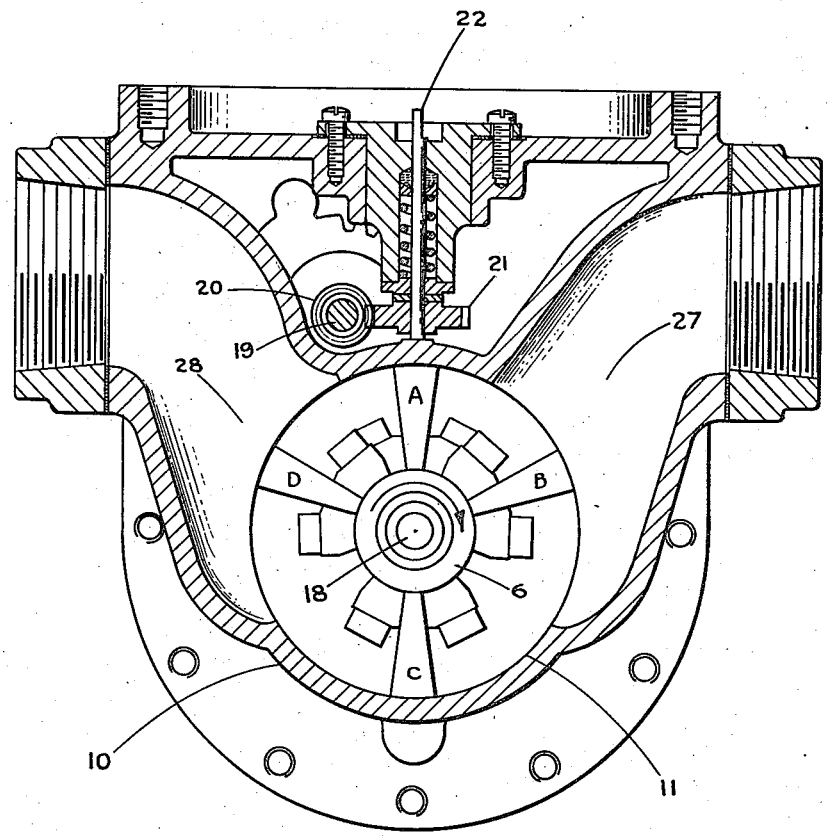
FIG. I
INVENTOR.
WILLIAM F. BERCK

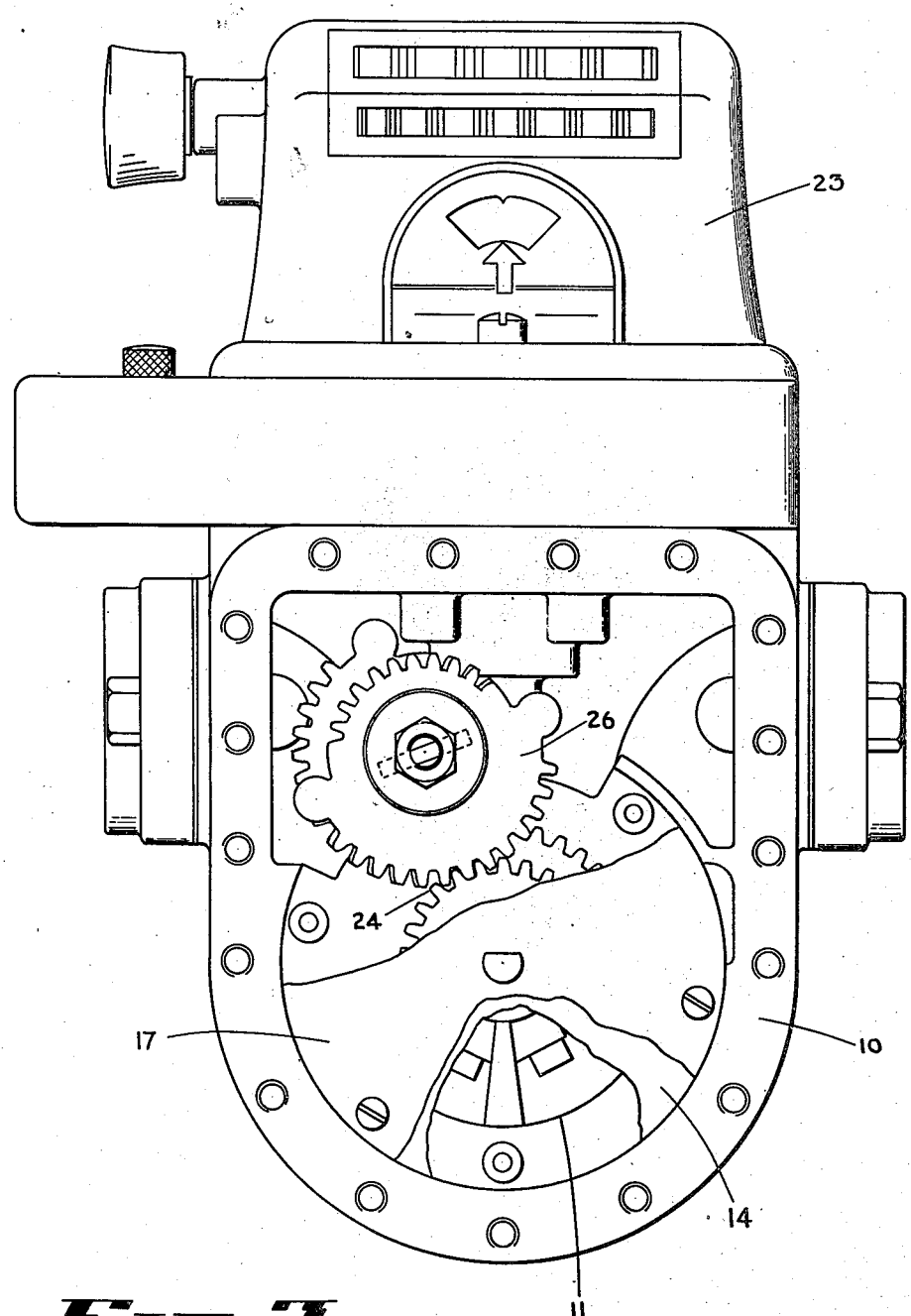

Feb. 26, 1946.   W. F. BERCK   2,395,714
ROTARY LIQUID METER
Filed March 6, 1944   5 Sheets-Sheet 4

DIAGRAM 1

DIAGRAM 2

INVENTOR.
WILLIAM F. BERCK
BY
Oscar A. Mellin
ATTY.

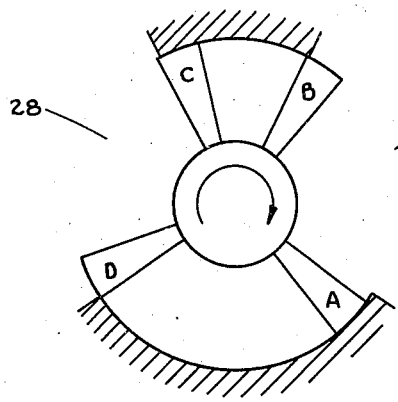
DIAGRAM 3
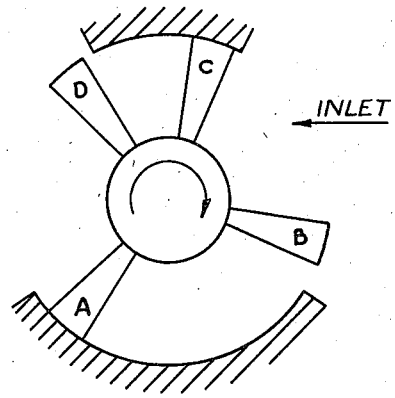
DIAGRAM 4
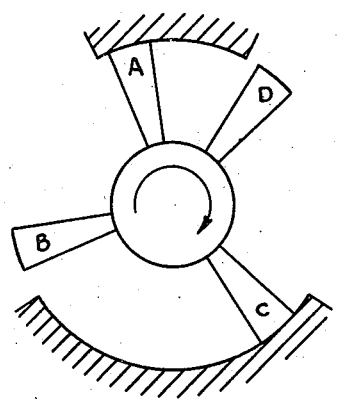
DIAGRAM 5

Patented Feb. 26, 1946

2,395,714

UNITED STATES PATENT OFFICE 2,395,714

ROTARY LIQUID METER

William F. Berck, Oakland, Calif., assignor to Ralph N. Brodie Company, Oakland, Calif., a corporation of California Application March 6, 1944, Serial No. 525,265

5 Claims. (Cl. 73—253)

This invention relates to fluid meters of the rotary displacement type.

It is the principal object of my present invention to provide a generally improved meter of the rotary displacement type of large capacity relative to its size, which will have balanced operating parts and the operation of which will consume a minimum of energy.

In practice, I provide a meter having a cylindrical metering chamber traversed by four vanes which revolve in cycles of different stages about the axis of the chamber in relatively timed relation. The stages of the cycle of each vane are timed in relation to the inlet and outlet ports so that the fluid pressure from the inlet port operates the vanes and the same act to discharge a precise amount of fluid through the outlet port during each cycle with a minimum of energy loss.

One form which the invention may assume is exemplified in the following description and illustrated by way of example in the accompanying drawings, in which:

Fig. 1 is a transverse sectional view through a meter embodying the preferred form of my invention.

Fig. 2 is a longitudinal sectional view through the same.

Fig. 3 is an end view of the meter with parts removed and broken away to more clearly disclose certain features.

Figure 7:
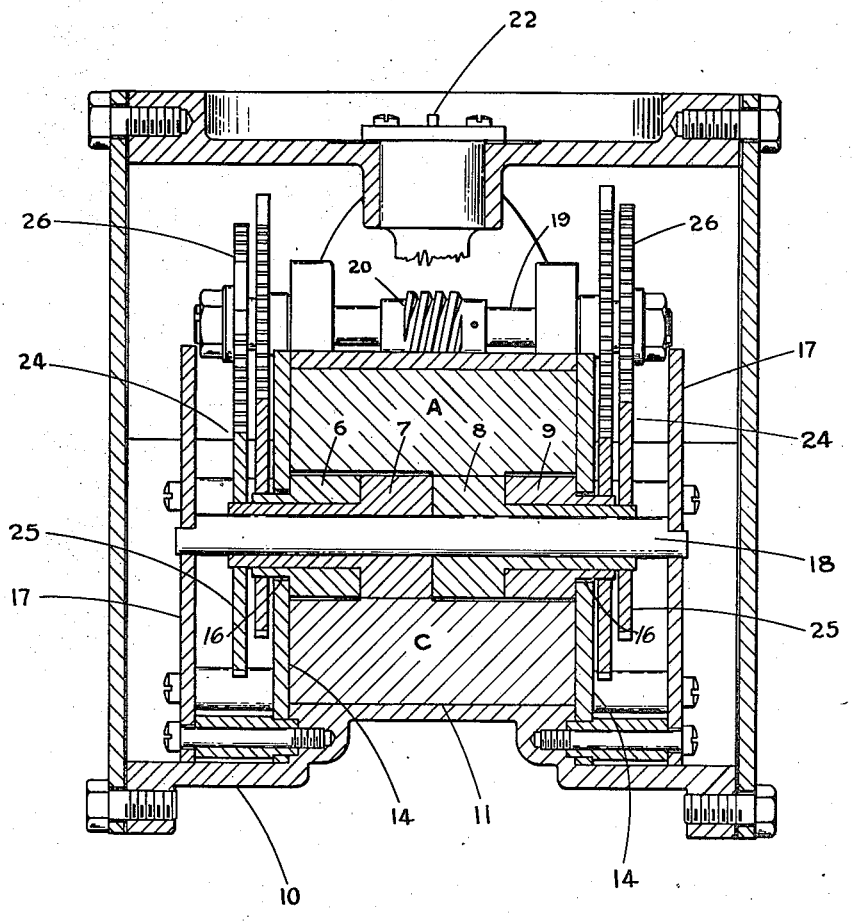
Figure 5:
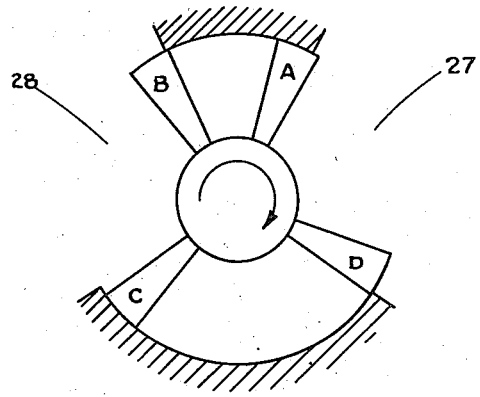
Fig. 5 is a set of related diagrams showing the cycle of operation of the vanes.
Figure 4:
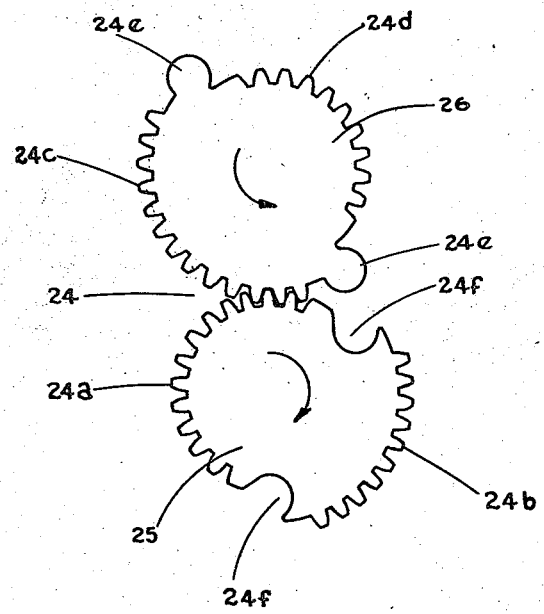
Fig. 4 is a view showing a gear set for one vane.

Referring more particularly to the accompanying drawings, 10 indicates a meter casing having a straight cylindrical bore or cylinder 11 extending longitudinally therethrough from end to end. Enclosing the ends of the cylinder are fixed head members 14 fastened at their periphery to the meter casing beyond the marginal edge of the cylinder bore 11. Coaxially of the cylinder 11, the head members 14 are formed with bores 16 which are in absolute alignment. Exteriorly of the head members 14 and spaced therefrom, are secondary head members 17 in which are fixed, in a non-rotatable manner, the ends of a non-rotatable vane bearing shaft 18 which, of course, is disposed in absolute axial alignment with the cylinder 11.

Rotatably mounted on the vane bearing shaft 18 are 4 vanes A, B, C and D which are all relatively rotatable to a controlled extent as will be herein described. It will be noticed that these four vanes have nesting and telescoping vane shafts 6, 7, 8 and 9, two of which, 6 and 7, project through one head member 14 and the other two, 8 and 9, of which project through the opposite head member 14. The construction of these telescoping vane shafts of the vanes A, B, C. and D is obvious from Fig. 2. From this figure, it will be noted that the shafts 6 to 9 inclusive, project beyond the head members 14 so that they may be associated with an interconnecting driving mechanism so that they will operate in synchronism throughout the stages of their cycle of operation. This driving mechanism includes a jack shaft 19 journaled on the meter casing in parallelism with the vane bearing shaft 18 and exteriorly of the cylinder 11. One purpose of this shaft is to operate the meter counter to indicate the quantity of fluid measured by the meter and discharged therefrom. For this reason the jack shaft 19 is fitted with a worm 20 meshing with a worm wheel 21 on a meter counter drive shaft 22. A counter 23 shown in Fig. 3 is mounted on the top of the meter casing and is driven from the shaft 22. Inasmuch as the detailed construction of the counter 23 and its connection with the shaft 22 forms no part of my present invention, it is not further illustrated.

Carried by the shafts of the vanes and by the jack shaft 19, are four sets of gears 24 there being one vane gear 25 for each vane and one jack shaft gear 26 in mesh therewith fixed on the jack shaft 19. The vane gears 25 are, of course, each fastened to their respective vane shaft. These sets of gears 24 operate in timed relation during the operation of the meter as will be hereinafter described, to drive the jack shaft 19 at a constant rotative speed at any given pressure.

The metering cylinder 11 is provided with an inlet port 27 and an outlet port 28 so that the fluid pressure entering the inlet port 27 and engaging the vanes A, B, C and D as the latter move to their proper position, cause the vanes to be driven in a clockwise direction (with reference to Fig. 1), and discharge the fluid through the outlet port 28.

It is seen from the drawings that the vanes A, B, C and D each extend the full radial dimension of the metering cylinder 11 and contact it at their outer peripheral edge. At their inner edges the vanes contact the periphery of the adjacent hubs or hollow shafts of the other vanes so that each vane forms a complete moving partition in the metering cylinder 11. The ends of the vanes slidably engage the inner surfaces of the head members 14 at opposite ends of the metering cylinder 11. The fits between the ends and outer and inner peripheral edges of the vanes and the walls of the metering cylinder 11, are substantially fluid tight under the differential pressures to which a meter of this type is subjected.

As illustrated in the drawings, it will be noticed that the outer peripheral edge of each vane is of a width subtending an angle of 15° at the axis, although I do not limit myself to this dimension.

At the inlet side of the metering cylinder 11, the inlet port 27 commences at a point 27° short of the vertical center line at the top of the cylinder 11 and extends to within 57° short of the vertical center line at the bottom of the cylinder 11. The outlet port 28 is of the same angularity and at the same relative position at the opposite side of the cylinder 11. Therefore, the cylindrical wall of the metering cylinder 11 between the ports at the top of the cylinder extends through 54° and the wall at the bottom of the cylinder extends through 114°, both, of course, extending equal distances at opposite sides of the vertical center line of the cylinder. Thus, each port extends through an angularity of 96°.

As previously described, each vane has an associated set of gears 24 comprising a vane gear 25 fixed to its shaft and a jack shaft gear 26 which is fixed to the jack shaft 19. The sets of gears 24 are identical in construction and formation although the jack shaft gears are progressively mounted at 90° apart. For the purpose of this description, it is believed sufficient to describe the formation of but one set of gears. Reference being had to the drawings, it will be seen that the vane gear 25 of each set is formed with a concentric segmental gear face 24a and a second concentric segmental gear face 24b of a greater radius than that of 24a. The jack shaft gear 26 of the set 24 is formed with a concentric segmental gear face 24c complemental to and meshing with the gear face 24a. The jack shaft gear is also formed with a concentric segmental gear face 24d complemental to and meshing with the teeth of the segmental gear face 24b.

Intermediate the jack shaft segments 24c and 24d, the jack shaft gear 26 is formed with intermediate exaggerated teeth 24e which are complemental to sockets 24f in the vane gear 25. The effect of these exaggerated teeth 24e and the complemental sockets 24f is to effect deceleration of speed between the high and low speed of the vane gear or vice versa as will be further explained.

Referring to the drawings and particularly to diagram No. 1 which shows the vane D, just after it has commenced its metering stage of operation. At this point the vane D will be at its highest speed. When the vane D is in this position, its gear set 24 will be in the position shown in diagram No. 2. Referring to this latter figure, it will be seen that at this time the gear segment 24a of the vane gear, has just commenced to mesh to the gear segment 24c of the jack shaft gear so that the vane D will commence to drive the jack shaft just as the vane reaches the sealed position shown in diagram No. 1. During this time, as previously stated, the vane D will be operated at its metering speed which is its highest speed. The illustrated driving relationship between the gears 25 and 26 for vane D remains constant for approximately 165° of rotation, at the end of which time one of the intermediate exaggerated teeth 24e on the jack shaft gear will commence to mesh with its complementary tooth socket 24f on the vane gear and causing deceleration of the vane gear 25, which deceleration continues through an arc of approximately 50°. The effect of the intermediate exaggerated tooth 24e and its socket 24f is to gradually change the gear ratio between the jack shaft gear and the vane gear of the set, decelerating the speed of the latter.

The rotative speed of the jack shaft gear will remain constant at all times because the following vane A will enter its highest speed or metering stage prior to vane D completing its highest or metering stage, which is after the time that vane D leaves the edge of the outlet port and opens up the space between vanes D and A to the outlet port. As previously described, the jack shaft gears of the sets are timed 90° apart and therefore an overlapping drive of said shaft 19 occurs to maintain its speed constant although the vane speeds vary at each stage of their complete cycle. In other words, the jack shaft 19 revolves constantly at a same speed in a fixed relation to the highest vane speed.

At the end of the deceleration stage, at which point the vane D is in the position shown in diagram No. 4, the segments 24b and 24d of its gear set commence to mesh so that the jack shaft gear will drive the vane gear through its lowest speed stage of approximately 95° of revolution. At the end of this lowest speed stage the vane D will reach the position shown in diagram 5. At this point the second intermediate exaggerated tooth 24e and its socket 24f will commence to accelerate the vane gear speed to its highest speed, or metering stage, which stage is reached when segments 24a and 24c commence to mesh and thereby begin a new complete cycle, just as previously described.

It is seen that when two vanes are in the metering stage with the space between them enclosed by the circumferential wall of the cylinder between the inlet and outlet ports, there is no relative movement between such vanes until after such space is in communication with the outlet port 28. In other words, referring to diagram No. 1, the moment that the vane D comes within, say, 3° of sealing position at the adjacent boundary of the inlet port 27, the vanes D and C move in unison at precisely the same speed until after the vane C has substantially passed the adjacent boundary of the outlet port 28 so that the space between the vanes D and C is in communication with that port.

This is likewise true during the low speed stage of the vane cycle when two vanes are simultaneously in register with the cylinder wall between the outlet and inlet ports. As shown in diagram No. 1, the vane A is in register with the cylinder wall between the outlet and inlet ports and the vane B is in register therewith so as to seal up the space between the vanes. At this point both vanes will operate at exactly the same speed and remain at such speed until after the vane A has moved to the position of vane D shown in diagram No. 5, opening up communication between the space between the vanes and the inlet port 27. Thus it is seen that except when the space between the vanes is in direct communication with either the inlet or outlet ports, there is no relative movement between the vanes. This is extremely important.

I point out that by the construction shown, and the ratio between the jack shaft and vane gears illustrated, the differential speeds between the vanes at their highest and lowest speed is approximately two to one. However, I am aware that other ratios can be employed and I do not limit myself to such ratio. I do wish to point out, however, that when one vane is going through the deceleration cycle, the vane approximately diametrically opposite it is going through its acceleration cycle so that one offsets the other and minimizes the loss of energy.

In operation of the meter, it is constructed and assembled as described with fluid under pressure present at the inlet port. Assuming that the vanes are in the position shown in diagram No. 1, the vane D will be driven by the pressure of the fluid in a clockwise direction. It will be noticed that in this position, a quantity of fluid is trapped or sealed between the vanes D and C. The vanes D and C will move in unison as previously described, with the fluid trapped or sealed between them, until the vane C uncovers the outlet port and reaches the end of its metering or highest speed stage. At this point the speed of vane C will commence to decelerate as previously described but the vane D will continue its highest speed stage until it likewise has uncovered the outlet port. Simultaneously with the above, the vane A after it has uncovered the inlet port, will commence to accelerate at the time the vane C commences to decelerate and the vane B will travel at its constant low speed until it has likewise passed the inlet port and commences its acceleration stage.

Inasmuch as the jack shaft will be driven at a speed in fixed relation to the highest speed stage of the vanes, the number of its rotations will be counted, due to its connection with the counter as previously described and interpreted thereby into gallons of fluid passing through the outlet port. In other words, knowing the amount of fluid discharged during each cycle from the meter, this amount is translated by rotation of the jack shaft into gallons on the counter. The amount of fluid discharged during each cycle will be the volume of fluid trapped between the vanes on the metering stage when in the position shown in diagram No. 1, minus the volume of fluid trapped between the other vanes in the position shown in diagram No. 1. It being obvious, of course, that the inlet and outlet ports and the metering cylinder 11 are constantly filled with liquid.

From the foregoing it is obvious that I have provided a highly efficient meter of exceeding simple construction in which the highest degree of mechanical balance has been obtained and in which the energy loss is held to a minimum. Obviously the meter here disclosed will be accurate in operation and effect a minimum of pressure drop from the inlet to outlet port thereof.

While I have shown the preferred form of my invention, it is to be understood that various changes may be made therein by those skilled in the art without departing from the spirit of the invention as defined in the appended claims.

Having thus described my invention, what I claim and desire to secure by Letters Patent is:

1. A rotary meter comprising a casing having an annular metering chamber having an inlet port and an outlet port formed in the peripheral wall thereof in spaced relationship, four vanes mounted in said chamber to traverse the same continuously in one direction, interconnecting means between the vanes causing each vane to operate through a complete cycle composed of a plurality of stages of relatively different speeds of angular velocity measured in radians per second, said stages including a metering stage of a constant highest speed commencing just prior to the boundary of the inlet port and continuing to a point beyond the adjacent boundary of the outlet port, a speed deceleration stage commencing at the end of the metering stage and continuing to a point just short of the other boundary of the outlet port at which point the vane reaches its lowest speed, a constant lowest speed stage commencing at the end of the deceleration stage and continuing until the vane passes the other boundary of the inlet port, and an acceleration stage commencing at the last named point and accelerating the speed of the vane until it reaches the speed of the constant highest speed at the point of commencement of the metering stage, said interconnecting drive means operating said vanes in such timed relationship that the deceleration stage of one vane coincides in time with the acceleration stage of another vane.

2. A rotary meter comprising a casing having an annular metering chamber having an inlet port and an outlet port formed in the peripheral wall thereof in spaced relationship, four vanes mounted in said chamber to traverse the same continuously in one direction, interconnecting means between the vanes causing each vane to operate through a complete cycle composed of a plurality of stages of relatively different speeds of angular velocity measured in radians per second, said stages including a metering stage of a constant highest speed commencing just prior to the boundary of the inlet port and continuing to a point beyond the adjacent boundary of the outlet port, a speed deceleration stage commencing at the end of the metering stage and continuing to a point just short of the other boundary of the outlet port at which point the vane reaches its lowest speed, a constant lowest speed stage commencing at the end of the deceleration stage and continuing until the vane passes the other boundary of the inlet port, and an acceleration stage commencing at the last named point and accelerating the speed of the vane until it reaches the speed of the constant highest speed at the point of commencement of the metering stage, said interconnecting drive means operating said vanes in such timed relationship that the deceleration stage of one vane coincides in time with the acceleration stage of another vane, the driving relationship between said vanes being such that the speed ratio between the highest and lowest speeds thereof is approximately 2 to 1.

3. A rotary meter comprising a casing having an annular metering chamber having an inlet port and an outlet port formed in the peripheral wall thereof in spaced relationship, four vanes mounted in said chamber to traverse the same continuously in one direction, interconnecting means between the vanes causing each vane to operate through a complete cycle composed of a plurality of stages of relatively different speeds of angular velocity measured in radians per second, said stages including a metering stage of a constant highest speed commencing just prior to the boundary of the inlet port and continuing to a point beyond the adjacent boundary of the outlet port, a speed deceleration stage commencing at the end of the metering stage and continuing to a point just short of the other boundary of the outlet port at which point the vane reaches its lowest speed, a constant lowest speed stage commencing at the end of the deceleration stage and continuing until the vane passes the other boundary of the inlet port, and an acceleration stage commencing at the last named point and accelerating the speed of the vane until it reaches the speed of the constant highest speed at the point of commencement of the metering stage, said interconnecting drive means operating said vanes in such timed relationship that the deceleration stage of one vane coincides in time with the acceleration stage of another vane, the synchronous operation of the vanes and spacing between the inlet and outlet ports relative thereto being such that no relative movement between adjacent vanes occurs except where either the inlet or outlet ports are in communication with the space between said vanes.

4. A rotary meter comprising a casing having an annular metering chamber formed therein having an inlet port and an outlet port formed in the peripheral wall thereof, a plurality of vanes mounted in the metering chamber to traverse the same continuously in one direction, said inlet port commencing at one point in said wall and extending for substantially 96 degrees in the direction of rotation of the vanes, the outlet port commencing at a point spaced substantially 114 degrees in the direction of rotation of the vanes from the last named terminal of the inlet port and extending to a point substantially 96 degrees short of the point of commencement of the inlet port, each of the said vanes having an imperforate peripheral surface in sliding contact with the peripheral wall of the metering chamber, interconnecting drive means between said vanes causing each vane to operate through a complete cycle of operation composed of four stages of relatively different speeds of angular velocity measured in radians per second, each stage commencing and terminating at definite points relative to the inlet and outlet ports, said stages including a metering stage commencing substantially when the advanced edge of the vane reaches the advance edge of the inlet port and continuing until the other edge of the vane passes the adjacent boundary of the outlet port a predetermined amount, a deceleration stage commencing at the end of the metering stage and continuing until the advanced edge of the vane approximately reaches the other boundary of the outlet port, a lowest speed stage commencing at the end of the deceleration stage and continuing until the rear edge of the vane passes the adjacent boundary of the inlet port, and an acceleration stage commencing at that point and continuing until the advanced edge of the vane substantially reaches the other boundary of the inlet port, said interconnecting drive means operating said vanes in such timed relationship that the deceleration stage of one vane coincides in time with the acceleration stage of another vane, said interconnecting drive means so operating the vanes in timed relation that no relative movement between adjacent vanes occurs except when either the inlet or outlet ports are in communication between the space between said vanes.

5. A rotary meter comprising a casing having an annular metering chamber having an inlet port and an outlet port in spaced relationship, said chamber defining sealing surfaces between adjacent edges of said ports, a plurality of vanes mounted in said chamber to traverse the same continuously in one direction and cooperate with said sealing surfaces, interconnecting drive means between the vanes causing each vane to operate through a complete cycle composed of a plurality of stages of relatively different rotational speeds of angular velocity measured in radians per second, one of said stages being a metering stage and being of a constant speed from at least one boundary of the inlet port along one of said sealing surfaces to at least the adjacent boundary of the outlet port in the direction of travel of the vanes, the succeeding stage being one of deceleration from the termination of the metering stage to a point not beyond the leading edge of the succeeding sealing surface, said interconnecting drive means between the vanes operating them in timed relationship, the operation of the vanes and spacing between the ports relative thereto being such that a pair of the vanes are periodically positioned on each of said sealing surfaces, and driven at identical speeds when so positioned, and a succeeding stage in said cycle being one of acceleration from a point beyond the trailing edge of said succeeding sealing surface to a point where it assumes a constant speed for the metering stage, said interconnecting drive means operating said vanes in such timed relationship that the deceleration stage of one vane coincides in time with the acceleration stage of another vane, and a volume indicating means driven in accordance with the movement of the vanes.

WILLIAM F. BERCK.